United States Patent [19]
Kozlovic

[11] 3,727,109
[45] Apr. 10, 1973

[54] TANK-TYPE GROUNDING AND TEST DEVICE WITH LINE, BUS AND TEST TERMINAL BUSHINGS

[75] Inventor: John M. Kozlovic, Greensburg, Pa.

[73] Assignee: Westinghouse Electric Corporation, Pittsburgh, Pa.

[22] Filed: Feb. 17, 1971

[21] Appl. No.: 116,106

[52] U.S. Cl. ............................... 317/103, 200/148 R
[51] Int. Cl. .................................................. H02b 1/20
[58] Field of Search ....................... 200/48 KB, 148 R, 200/162, 146 AA, 148 R, 148 H; 174/51; 317/103, 99

[56] References Cited

UNITED STATES PATENTS

| | | | |
|---|---|---|---|
| 2,600,304 | 6/1952 | Krida | 317/103 |
| 3,590,188 | 6/1971 | Frink et al. | 200/148 R |
| 3,603,752 | 9/1971 | Frink | 200/148 R |
| 2,735,042 | 2/1956 | Hayford et al. | 317/103 X |
| 3,071,669 | 1/1963 | Leeds et al. | 200/148 B X |
| 2,504,775 | 3/1950 | Wood | 317/103 |
| 3,130,352 | 4/1964 | Guinan | 317/103 |
| 3,161,804 | 12/1964 | Guinan | 317/103 X |
| 3,099,724 | 7/1963 | Sillman et al. | 200/148 B X |

*Primary Examiner*—Richard B. Wilkinson
*Assistant Examiner*—U. Weldon
*Attorney*—A. T. Stratton, C. L. McHale and W. R. Crout

[57] ABSTRACT

A tank type grounding and test device is provided for metal-clad switchgear, which takes the place of the usual circuit breaker within the metal-clad switchgear housing. This equipment includes bus-and-line terminal bushings (identical to circuit-breaker bushings), and, additionally, a test bushing, which extends out of each of the pole-units, and is accessible from the front of the equipment. Interiorly of each tank, constituting a single pole-unit, is a rotatable selector switch, which is manually selectively positioned to contact either the bus or line terminals. The equipment performs three important functions, namely determining whether or not either the bus or line terminals are energized, secondly providing a ground connection to either the bus or line terminals, and thirdly, when desired, enabling a high-voltage test to be imposed upon either the line or bus circuits.

The selector switch is manually selected to one of its two positions before the equipment is moved into an operative position within the cubicle. After the equipment is positioned in an operative position within the cubicle, it is impossible to move the selector switch to its other alternative position.

The grounding device is of the same dimensions, and can be rolled into the same cell structure of the metal-clad switchgear equipment which accommodates the usual circuit-breaker unit.

18 Claims, 10 Drawing Figures

INVENTOR
John M. Kozlovic

TANK-TYPE GROUNDING AND TEST DEVICE WITH LINE, BUS AND TEST TERMINAL BUSHINGS

CROSS-REFERENCES TO RELATED APPLICATIONS

Reference may be made to U.S. Pat. application filed Jan. 15, 1970, Ser. No. 3,182 now U.S. Pat. No. 3,603,752 issued Sept. 7, 1971 to Russell E. Frink, entitled "GROUNDING-SWITCH DEVICE," and assigned to assignee of the instant application.

The related circuit-breaker structure is described in a number of patent applications, a typical one being U.S. Pat. application filed Sept. 1, 1966, Ser. No. 576,740, now U.S. Pat. No. 3,590,188, issued June 29, 1971 to Russell E. Frink and William H. Fischer, entitled "FLUID-BLAST CIRCUIT INTERRUPTER WITH PISTON ASSEMBLY AND ELECTROMAGNETIC DRIVING MEANS," and assigned to the assignee of the instant patent application.

BACKGROUND OF THE INVENTION

It is desirable to be able to ground high-voltage electrical circuits to ensure the safety of workmen working on either the circuits, or associated apparatus. In the case of metal-clad switchgear, all conductors are so insulated that the only points available to safely apply grounds through a circuit are at the primary disconnecting contacts, thereby making it necessary to provide a grounding device for use with these contacts, namely the bus or line contacts, in the metal-clad switchgear.

There is some hazard involved in case the operator makes a mistake, and starts to ground a live circuit. In order to avoid this risk to life and property, various devices have been made for checking and interlocking against applying grounds to a live circuit. However, under certain conditions, it may be desirable to ground a live circuit, providing the grounding device is capable of making the ground connection with safety. The device should, consequently, provide for grounding either the bus, or the line circuits available in a metal-clad switchgear housing.

In any electrical power system, it is frequently necessary to make repairs or alterations to the equipment connected to the circuit. The usual operation procedure, in such a case, always is to connect the electrical circuit of such equipment to ground potential, thereby establishing conditions, such that contact with the electrical circuit will not be injurious either to personnel, or to the equipment. Such precautions are, of course, necessary to prevent dangerous working conditions. The dangers of contact with energized circuits at high voltages will thereby be removed. The dangers of contact with energized circuits, after previously being deenergized, will, correspondingly, be decreased.

It has been common practice to use a ground and test device in conjunction with metal-clad switchgear during maintenance periods. This is, of course, a device, which is interchangeable with a circuit breaker, which can ground either bus or line circuits within the switchgear cell.

Such devices, for example, are available for 5 and 15 KV metal-clad switchgear, but for the higher voltages, such as 23 and 34.5 KV, may be insulated with sulfur-hexafluoride ($SF_6$) gas, or other dielectric gas, available space prevents following established design practice.

As mentioned heretofore, a ground and test device is used in conjunction with metal-clad switchgear during installation and maintenance. It is a device which is interchangeable with a circuit breaker that is capable of grounding either the bus or the line circuit. In some cases it can be used to apply test voltage to the external circuit and can also be used for phasing if all the terminals are available. To be capable of grounding the circuit safely, the device must be mechanism operated. In some cases it is not necessary that the device be capable of grounding the circuit even though it may be energized. In this case only means for connecting to an external ground are required and a mechanism is not necessary. This type of ground and test device, without a mechanism, is often referred to as a simple ground and test device, and it is with this type of equipment that the present invention is concerned.

SUMMARY OF THE INVENTION

It is, accordingly, a general object of the present invention to provide an improved simple grounding and testing device, which will be simple and efficient in operation, and which may be economically manufactured and installed.

Another object of the present invention is to provide an improved simple grounding device, which will facilitate the grounding of any given electrical circuit, such as a bus or line circuit, within an enclosed-type switchgear installation.

Still a further object of the present invention is to provide an improved simple grounding and testing device for metal-clad switchgear, which is interchangeable with the circuit-breaker unit, which is normally used within the cell structure, and is removable therefrom.

Another object of the present invention is to provide an improved simple grounding and testing device, which will selectively ground either the line or bus terminals with a selector-switch mechanism.

Another object of the present invention is the provision of an improved grounding switch, which has an accessible test terminal bushing at the front end thereof, and an interiorly-disposed selector switch for selectively grounding either the line or bus terminals.

In accordance with a preferred embodiment of the invention, a tank-type grounding switch is provided capable of retaining a highly-insulating gas, such as sulfur-hexafluoride ($SF_6$) gas, for example, involving both a selector switch, which is preferably manually operated to one of two desired positions, and a readily accessible test-terminal bushing, which makes electrical connection with the selector switch terminal.

In accordance with a preferred embodiment of the present invention, the selector switch is rotatably actuated to move a conducting blade into the finger-contact structure of either the line or bus terminals. For a three-phase installation, preferably, the crank-arm structures for all of the selector switches of the several pole-units are all connected together, and may be simultaneously manually actuated externally of the equipment.

Further objects and advantages will readily become apparent upon reading the following specification, taken in conjunction with the drawings.

DESCRIPTION OF THE PREFERRED EMBODIMENT

It is common practice to use a ground-and-test device in conjunction with metal-clad switchgear during maintenance periods. This is a device which is interchangeable with a circuit breaker, which can ground either circuit in the metal-clad switchgear cell structure. Such a device must have the same insulation level and the same momentary and short-time current ratings as the switchgear. Such devices are available for 5 and 15 KV metal-clad switchgear, but for high voltages, say 23 and 34.5 KV, which may be insulated, for example, with sulfur-hexafluoride ($SF_6$) gas, or other dielectric gas, available space prevents following established design practice.

Figure 1:
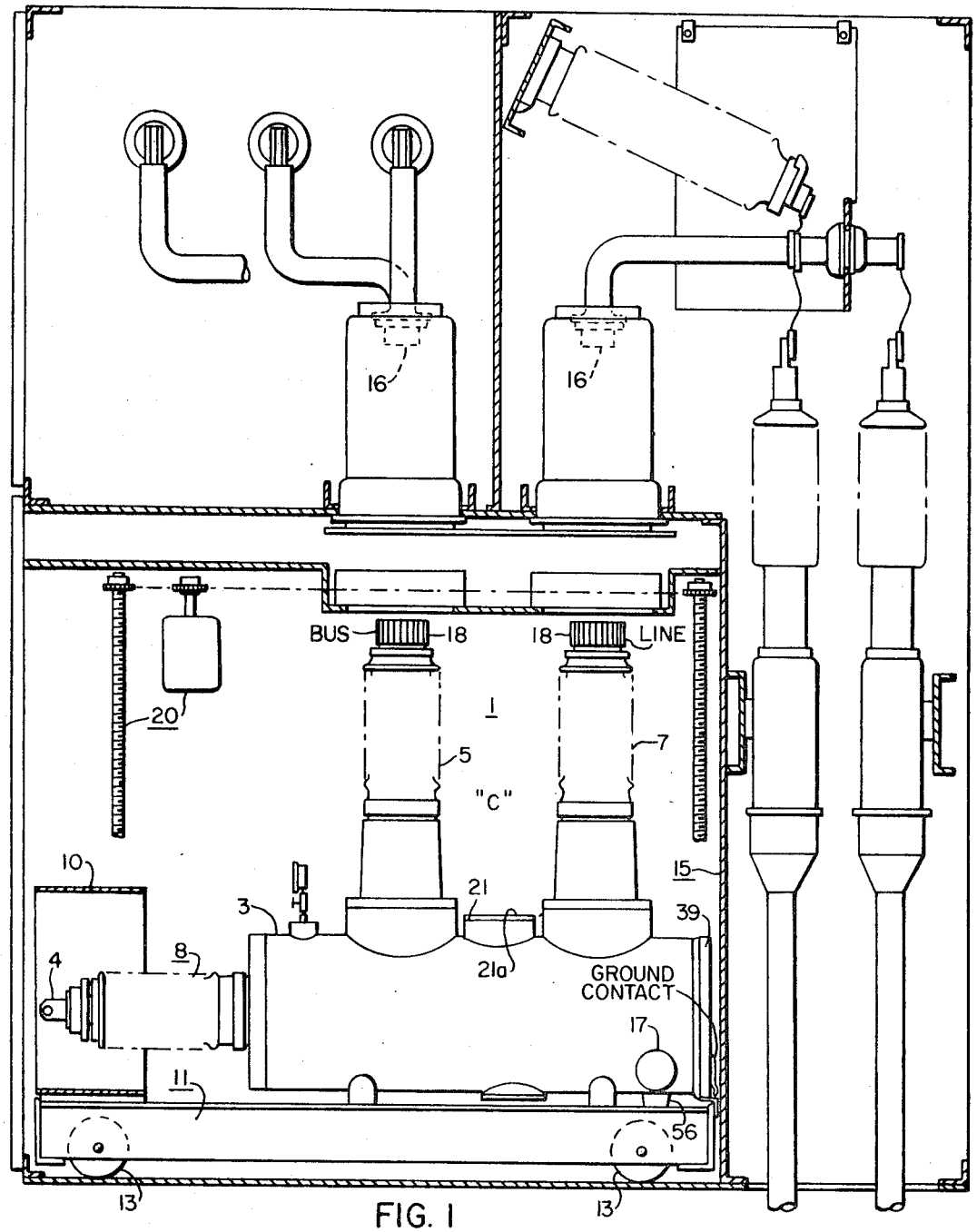
FIG. 1 is a side elevational view, partly in section, of the grounding device of the present invention moved into the metal-clad switchgear cell structure, and showing its association with related line and bus equipment.
Figure 2:
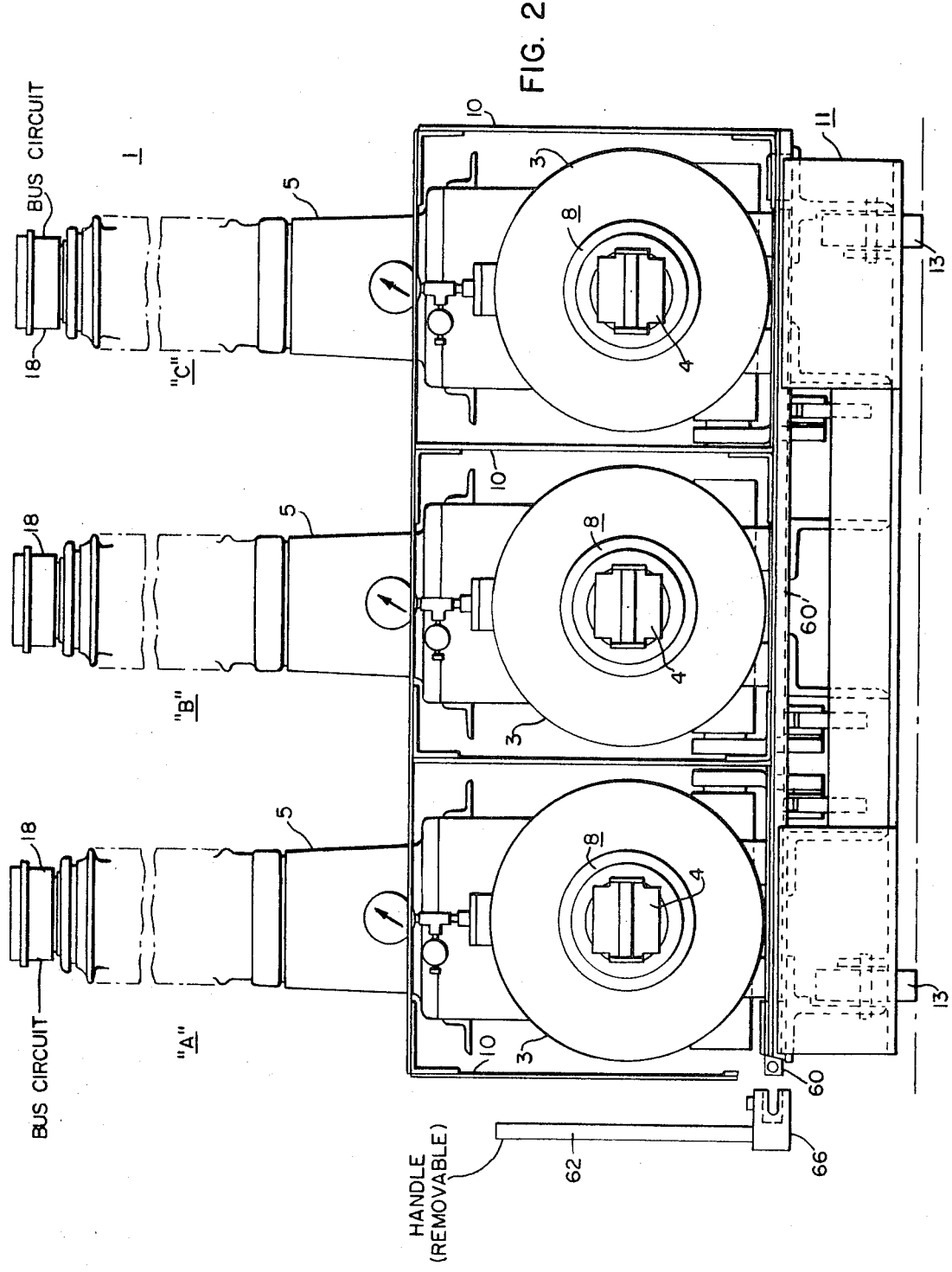
FIG. 2 is an enlarged end front elevational view of the grounding device structure of FIG. 1.
Figure 3:
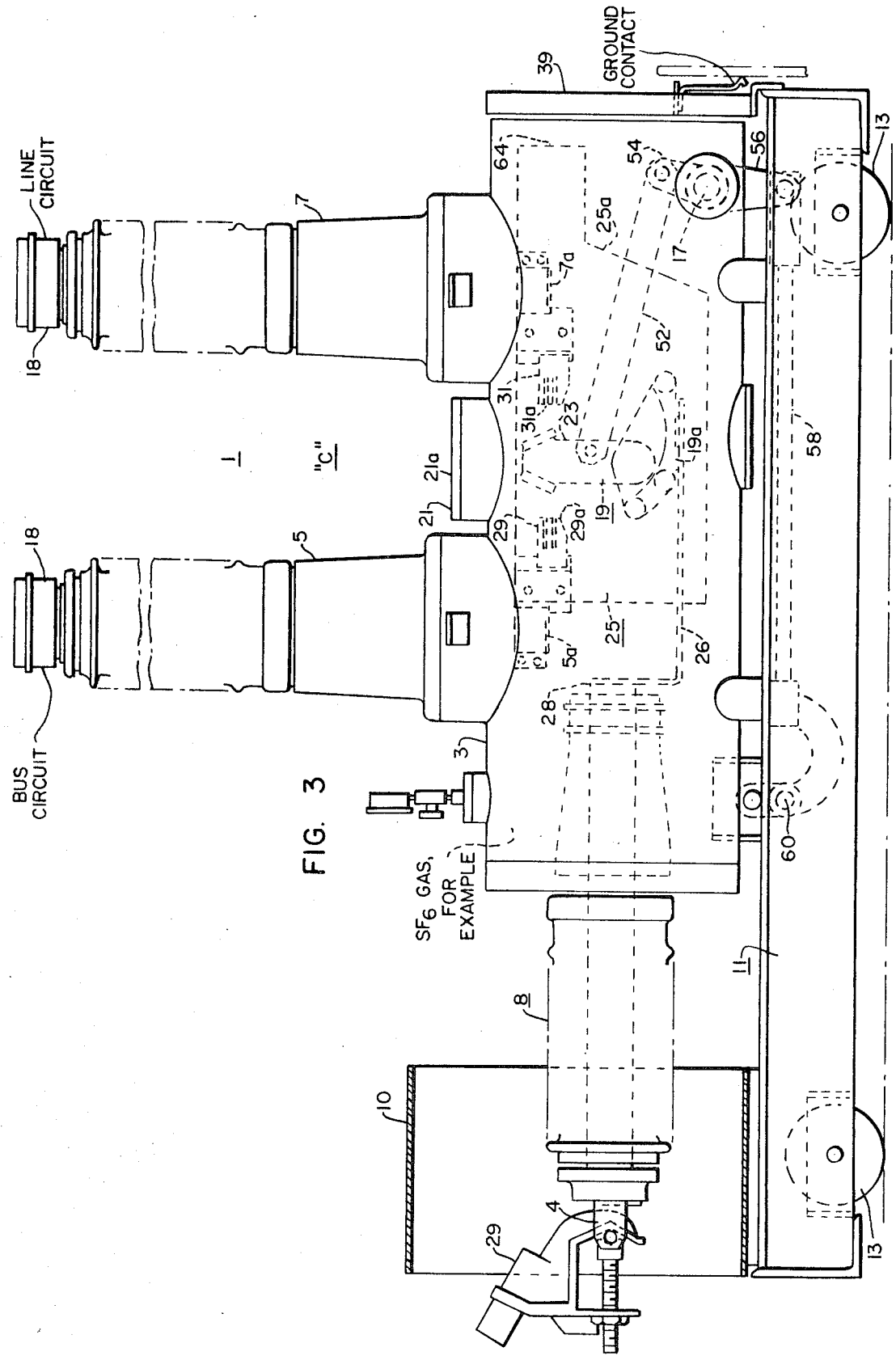
FIG. 3 is a side elevational view of the grounding-device structure of FIG. 2, with the grounding switch shown in the open position.

The present invention relates to a grounding device, which is adaptable for grounding either the bus or line circuits of metal-clad switchgear equipment. As shown in FIGS. 1–3, essentially, the device 1 comprises three grounded metallic tanks 3 equipped with porcelain bus and line bushings 5 and 7 and with a forwardly-extending test bushing 8 all mounted on a structural steel frame 11, which may be equipped with wheels 13, for motion into a cell structure 15 in place of the usually-employed circuit-breaker unit, as illustrated in FIG. 1 of the drawings.

Figure 4:
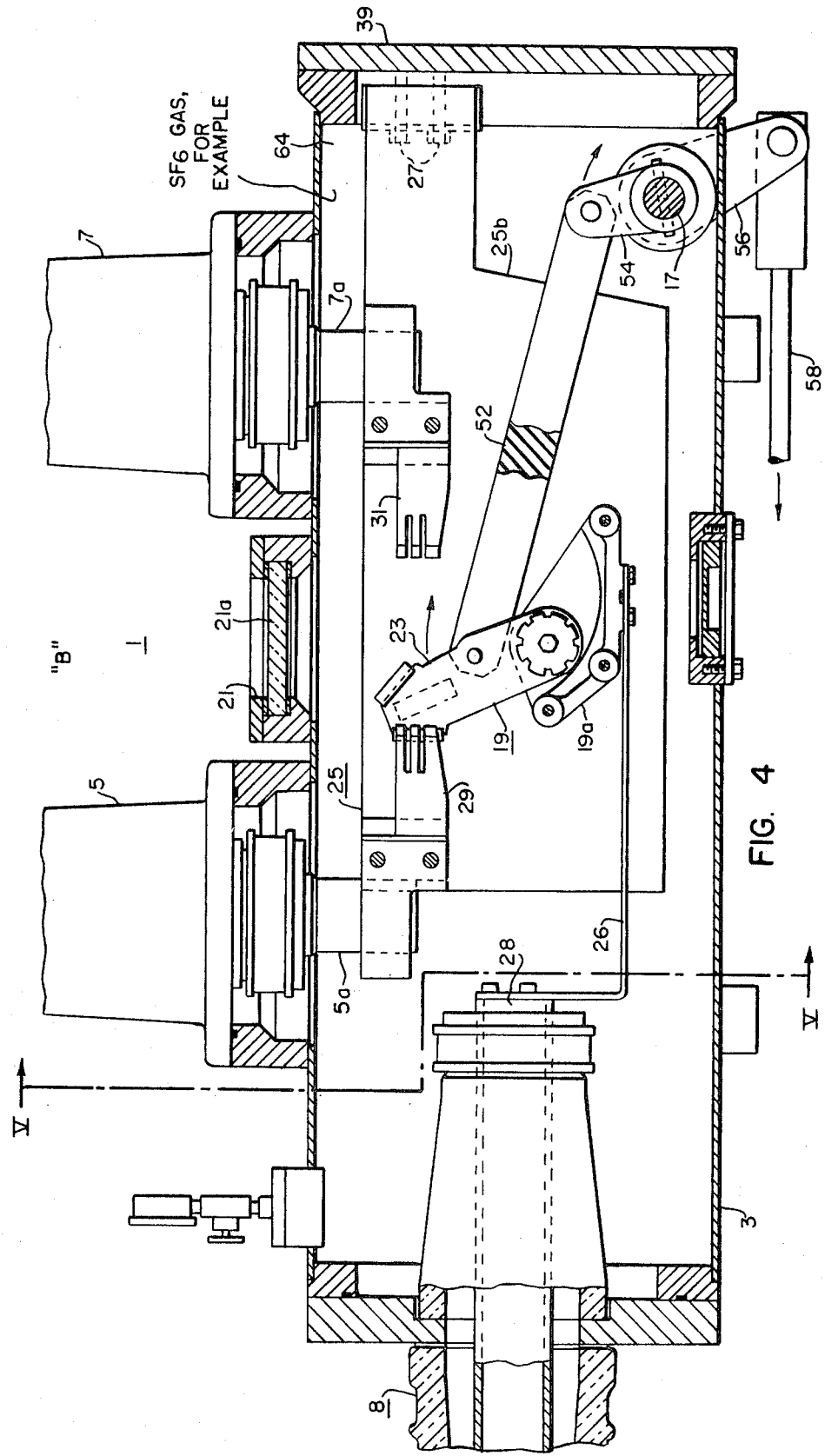
FIG. 4 is a longitudinal sectional view taken through the enclosed tank structure, indicating the position of the grounding device in which the front bus terminal bushing can be grounded.
Figure 5:
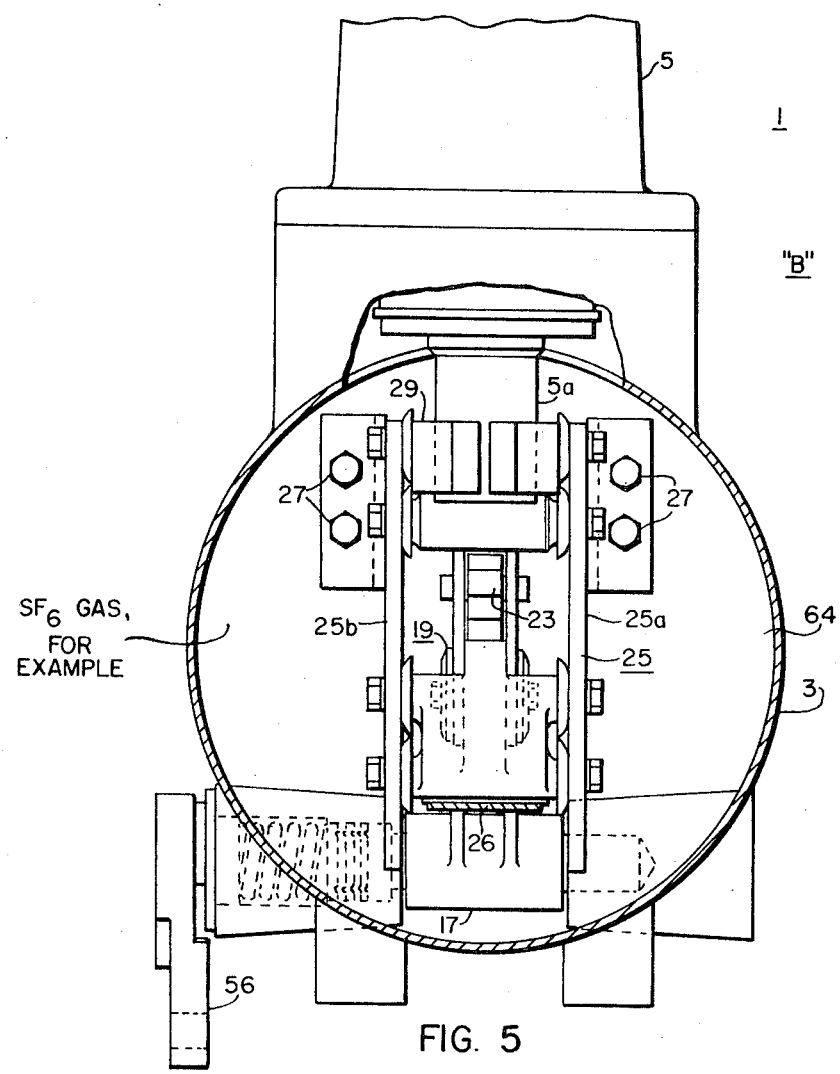
FIG. 5 is a sectional end view taken substantially along the line V—V of FIG. 4.

A section of the individual pole-unit "A" is shown in FIGS. 4 and 5 of the drawings. Generally, the tank assembly 3 is similar to the tanks, which have been employed for circuit-breaker use, such as set forth in U.S. Pat. application filed Sept. 1, 1966, Ser. No. 576,740 now U.S. Pat. No. 3,590,188 issued to Russell E. Frink and William H. Fischer, and assigned to the assignee of the instant application. Reference may be had to FIG. 35 of the aforesaid patent application, Ser. No. 576,740, to show the use of the circuit-breaker structure within the associated cell structure 15.

With reference to FIGS. 4 and 5, it will be noted that there is a rotating shaft 17 provided at the lower right-hand end of the tank assembly 3 to cause the operation of a selector switch, generally designated by the reference numeral 19. Also, an additional change from the circuit-breaker application is an access port 21, which has been provided between the terminal bushings 5, 7 to visually determine the position of the selector-switch blade 23.

Figure 7:
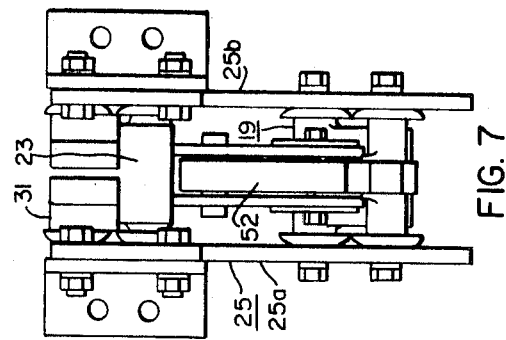
FIG. 7 is an end elevational view of the selector switch supporting structure of FIG. 6.
Figure 6:
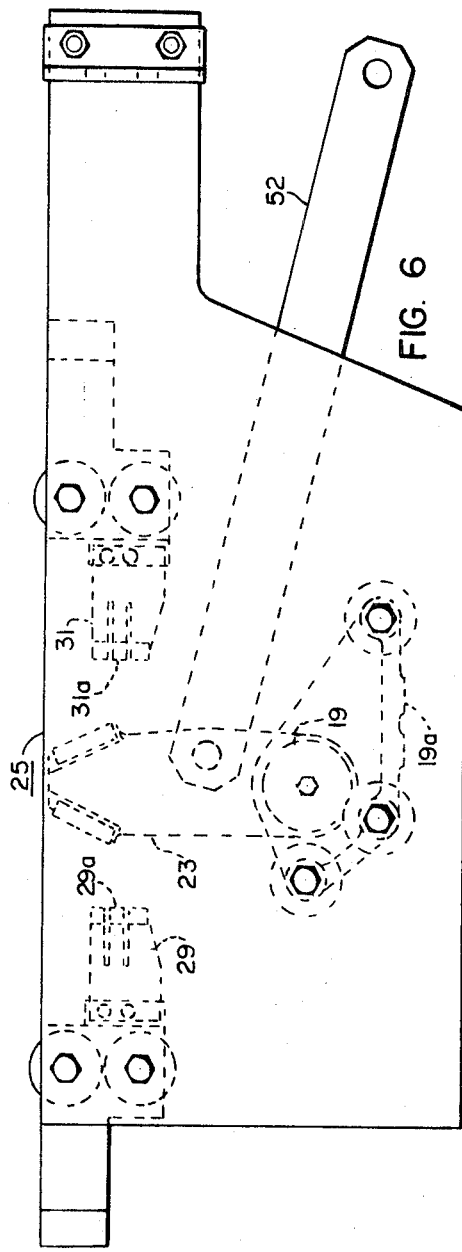
FIG. 6 is a detail view of the selector-switch supporting structure.

A contact-and-barrier assembly 25, shown in more detail in FIGS. 6 and 7, has been provided within the tanks 3 being secured to the terminal bushings 5 and end plate 39 by mounting bolts 27. Generally, the contact-and-barrier assembly 25 comprises two barriers 25a, 25b, formed of insulating material, between which are clamped connector assemblies 29, 31, and the selector-switch assembly 19 which is rotatably actuated. The connector assemblies 29, 31 clamp to the lower ends of the terminal bushings 5, 7 and carry sets of finger contacts 29a, 31a, which cooperate with the blade 23 of the selector switch 19. The hinge member 19a of the selector switch assembly 19 is connected by a conductor strap 26 to the inner terminal 28 of the test bushing 8. The selector-switch blade 23 is operated by an insulating link 52, which attaches to a lever 54, which is pinned to the shaft 17. Externally of the tank structure 3, the levers 56 (FIG. 5) of the shaft assemblies 17 are connected by links 58 to a cross-shaft 60, which is connected to a manually-operable handle, designated by the reference numeral 62 in FIG. 2.

Figure 9:
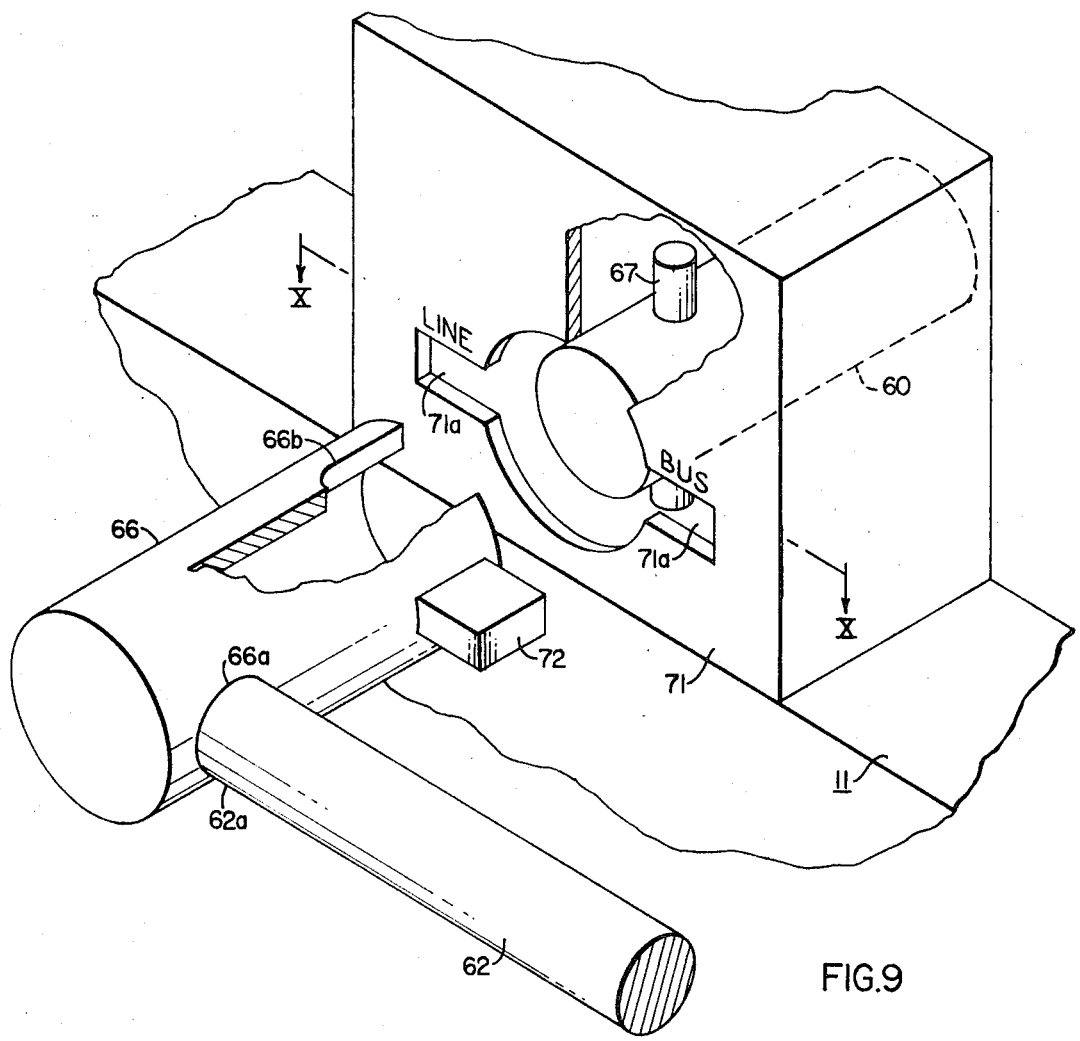
FIG. 9 is a considerably enlarged view illustrating the manually-operable handle and its connecting sleeve spaced away from the end of the driving shaft for operating the selector switches, and showing the interlocking features between the handle and the driving-shaft; and, FIG. 10 is an enlarged detailed fragmentary view, taken substantially along the line X—X of FIG. 9, and illustrating the mechanical interengagement between the operating handle and the drive-shaft.
Figure 10:
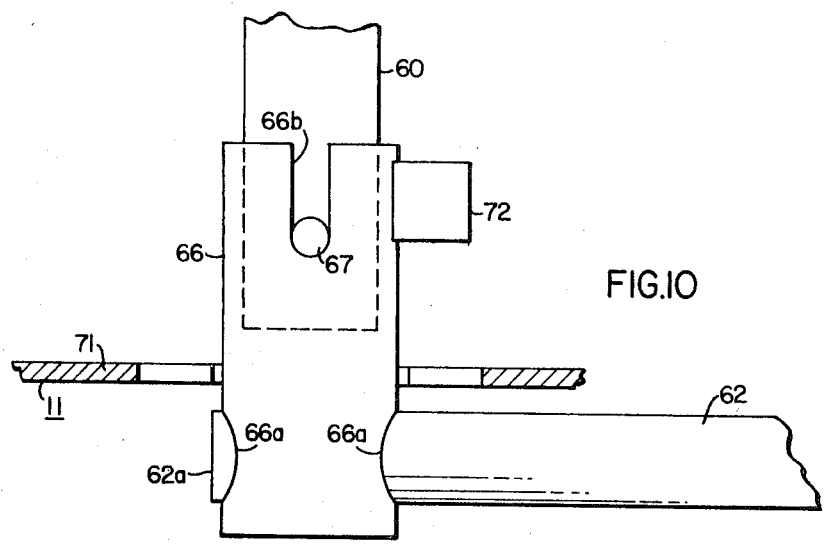

With reference to FIGS. 9 and 10, it will be noted that the selector-switch operating handle 62 is fixedly attached to a tubular hub, or drive-sleeve, designated by the reference numeral 66. In more detail, the hub, or drive-sleeve 66 has a pair of diametrically-opposed apertures 66a provided in the end portion thereof, as shown in FIG. 10, through which the end 62a of the handle 62 projects, so as to fixedly secure the handle 62 to the driving-sleeve 66.

In addition, the hub or drive-sleeve 66 has a pair of diametrically-opposed notches 66b provided therein, which make interlocking engagement with a steel pin 67, the latter extending transversely through the end of the drive-shaft 60. FIG. 10 shows the locking interengagement between the hub, or drive-sleeve 66 and the pin 67, so that rotary motion of the handle 62 will cause corresponding rotary motion of the drive-shaft 60. This will, of course, effect actuation of the three selector switches 19 provided in the three pole-units "A", "B", and "C".

Attached to the frame 11 of the device 1 is an interlocking bracket 71, which has a pair of diametrically-opposed notches 71a provided therein to accommodate a tongue, or bar 72, which is welded to the inner end of the drive-sleeve 66. Once the hub or driving-sleeve 66 is inserted over the drive-shaft 60, with the pin 67 making mechanical interengagement with the notches 66b, the bar 72 will be on the inside of the interlocking bracket 71, and it will be impossible to effect the withdrawal of the handle 62 and driving-sleeve 66 unless the selector switch 19 is in one of its two end positions, making full contact with either the bus or line contacts 29 or 31, as desired.

In operation, the tanks 3 are filled with a suitable insulating gas 64, such as sulfur-hexafluoride ($SF_6$) gas under pressure. If it is desired to ground the circuits, which are connected to the rear breaker studs, which may be the line circuits, the selector switch 19 is connected to the rear terminal bushings 7 by operating the handle 62 manually to connect the selector switch 19 with the rear terminal bushings 7. The handle 62 is then removed, and the grounding device 1 is inserted within the cell structure 15 in place of the circuit breaker. Link 52 does not go into toggle. Link 58 which operates link 52 through 56, 54 and shaft 17 goes into toggle at the end opposite shaft 17 preventing contact blow open.

The foregoing device 1 has no closing capability, but has means for checking that the circuit in question is not energized before applying the ground, means for applying an external ground to either the bus circuit or to the line circuit, and means for applying a test voltage to either the bus or line circuits of the switchgear under tests. It will be noted that the special test terminal bushing 8, extending out the front of the equipment, is readily accessible.

The test bushing 8 is a means for checking if the circuit in question is energized or not. It is the means of applying the ground to the circuit. Additionally, it is also the means whereby test voltage may be applied to either the bus circuit or to the line circuit. Test terminal 4, situated on the external end of the test terminal bushing 8, is the point of electrical contact for all of these functions.

The insulating barrier 10 surrounds the conducting test terminals 4 of the several test terminal bushings 8 to provide phase-to-phase insulation.

By way of recapitulation, the grounding and testing device 1, without a mechanism, is used as follows:

Referring to FIGS. 2 and 3 the ground and test device 1 is used as follows. First the breaker must be removed from the cell 15 of the circuit to be checked. Then the operator must decide whether he wants to check the bus or line side of the circuit. Once the decision is made, the bus or line selector switch 19 is placed in the desired bus or line position by means of handle 62. The handle 62 is so arranged that once it is engaged it cannot be removed unless the bus or line selector switch 19 is in the fully-engaged position. At this time the operator can check the position of the switch by looking through the glass 21. The device is now ready to be moved into the cell 15. However, it cannot be placed in the cell 15 with the selector switch operating handle 62 in place because of an interference between the handle 62 and the lift mechanism 20 in the cell 15. Because of other interferences, the handle 62 cannot be engaged when the ground and test device 1 is in the cell 15.

Once in the cell 15 the ground and test device 1 is raised to the operating position by the lift mechanism 20 in the cell in the same manner that a breaker (not shown) is lifted. In the operating position the primary disconnecting contacts 18 engage with the stationary contacts 16 in the cell, and terminal 4 of test bushing 8 is connected through bus 26 terminal 19a and selector switch 19 to either the bus or the line side of the circuit as previously selected by the operator before the device 1 was placed in the cell 15.

Figure 8:
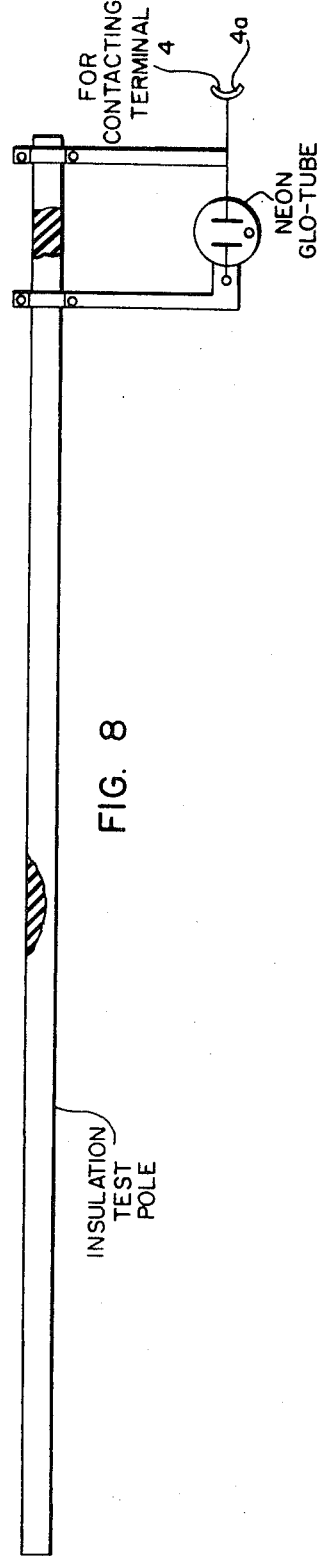
FIG. 8 is a diagrammatic view of the hot-stick equipment.

At this time, the operator may check terminal 4 for the presence of voltage by means of a Neon Glo-tube (FIG. 8), a potential transformer, or any other means he may have at his disposal. After determining that the circuit in question is electrically dead, the operator may attach cables 29 (FIG. 3) which are connected to the station ground to terminal 4 thus grounding the selected circuit.

If the objective is to apply a test voltage to the circuit, the output of any suitable voltage source may be applied to terminal 4 and by the same means as before the test voltage is applied to the selected circuit.

If it is desired to perform similar tests on the other half of the circuit, the ground and test device 1 must be removed from the cell 15 to change the bus or line selecting switch 19 to the other position.

Based on experience at the lower voltages, some utility customers require that the operators be able to see directly the position of the selector-switch blade 23 before the device 1 is inserted into the cell structure 15. If this is the case, the access port 21 between the terminal bushings 5, 7 may contain a transparent window 21a.

From the foregoing description, it will be apparent that the grounding and test device 1, without a mechanism, is safe to operate, ensures that voltage is removed from either the bus or line circuits prior to the connection of either of these circuits to a ground connection, and, finally, enables a high-voltage test to be applied to either the bus or line circuits for a testing of the insulation on said respective circuits.

Although there has been illustrated and described a grounding and test device, which functions without an operating mechanism, it is to be clearly understood that the same was merely for the purpose of illustration, and changes and modifications may readily be made therein by those skilled in the art, without departing from the spirit and scope of the invention.

I claim as my invention:

1. In metal-clad switchgear equipment, the combination of:
   a. means defining a line terminal;
   b. means defining a bus terminal;
   c. a grounding-and-test structure adaptable for insertion into operative position within the cubicle of the metal-clad switchgear equipment including:
      i. a tank having only line, bus and test terminal bushings supported thereon;
      ii. spaced stationary contact structures electrically connected to the interior terminals of the respective line and bus terminal bushings and thereby constituting line and bus contacts;
      iii. a two-position selector switch adaptable for engagement with either of said interiorly disposed stationary bus or line contacts and located within the tank;
      iv. said selector switch having a moving contact associated therewith to make selective engagement with either of said spaced stationary line and bus contacts;
      v. means electrically connecting said movable contact of the selector switch with the interior end of said test-terminal bushing at all times;

vi. operating means for actuating said movable contact of the selector switch extending through the wall of said tank;

vii. manually-operable means disposed externally of the tank for actuating said operating means for thereby selectively moving said moving contact of the selector switch to either of said spaced stationary line and bus contacts to thereby electrically connect said moving contact to either the line or bus contacts;

viii. and means preventing manual operation of said manually-operable means when the grounding-and-test structure is inserted within the cubicle.

2. The combination of claim 1, wherein the tank contains a highly-insulating gas having excellent insulating properties.

3. The combination of claim 1, wherein the tank contains sulfur-hexafluoride ($SF_6$) gas.

4. The combination of claim 1, wherein the grounding device is interchangeable with a circuit-breaker unit and may be rolled into the cubicle structure of metal-clad switchgear equipment.

5. The combination of claim 1, wherein the grounding device includes a mechanical linkage which is in toggle in either closed position of the selector switch.

6. The combination of claim 1, wherein an insulating barrier encloses the external end of the test terminal bushing.

7. The combination of claim 1, wherein the grounding device has the selector switch rotatively mounted upon an insulating barrier plate.

8. The combination of claim 7, wherein two spaced insulating barrier plates in parallel relation are used.

9. The combination of claim 3, wherein an insulating barrier plate is removably disposed within the tank structure and rotatively supports the selector switch.

10. The combination of claim 1, wherein a viewing window is located between the line and bus terminal bushings.

11. The combination of claim 2, wherein a viewing window is located between the line and bus terminal bushings.

12. The combination according to claim 1, wherein the line and bus terminal bushings are disposed in generally parallel relationship, and the test-terminal bushing is disposed at the end of the tank and generally transversely of the aforesaid line and bus terminal bushings.

13. In metal-clad switchgear equipment, the combination of:

a. a cubicle structure supporting both line and bus terminals;

b. a roll-in-type grounding-and-testing device having corresponding line and bus terminals capable of making contact with the aforesaid line and bus terminals supported by the cubicle structure;

c. said grounding-and-testing device including a grounded metallic tank structure supporting only line, bus and test terminal bushings and containing a highly-insulating gas;

d. said grounded metallic tank structure having disposed therein a two-position selector switch having a moving contact;

e. means electrically connecting said moving contact with the interior end of said test terminal bushing at all times;

f. means operable externally of said grounded tank structure for effecting selective engagement of said movable contact with either said line or bus terminals supported on the tank structure; and, g. means preventing a change of said movable contact once the grounding-and-test device has been inserted within the cubicle structure.

14. The combination according to claim 13, wherein the highly-insulating gas comprises sulfur-hexafluoride ($SF_6$) gas.

15. The combination according to claim 13, wherein the selector switch has linkage associated therewith which is in toggle in either position of the moving contact of the selector switch.

16. The combination according to claim 13, wherein said line, bus and test terminals are constituted by three terminal bushings supported by said grounded metallic tank structure.

17. The combination according to claim 16, wherein the line and bus terminal bushings are disposed in generally parallel relationship, and the test-terminal bushing is located adjacent the end of the metallic tank structure and generally transverse with respect to said line and bus terminal bushings.

18. The combination according to claim 13, wherein a viewing window is located between the line and bus terminals of the roll-in-type grounding-and-test device.

* * * * *